United States Patent
Cash et al.

(10) Patent No.: US 6,924,607 B2
(45) Date of Patent: Aug. 2, 2005

(54) METHOD AND APPARATUS FOR AUTOMATICALLY SHUTTING OFF A MICROSCOPE

(75) Inventors: David J. Cash, Kenmore, NY (US); Vincent Vaccarelli, Getzville, NY (US)

(73) Assignee: Leica Microsystems Inc., Depew, NY (US)

( * ) Notice: Subject to any disclaimer, the term of this patent is extended or adjusted under 35 U.S.C. 154(b) by 165 days.

(21) Appl. No.: 10/040,566

(22) Filed: Jan. 7, 2002

(65) Prior Publication Data

US 2003/0127991 A1 Jul. 10, 2003

(51) Int. Cl.$^7$ .............................. G05F 1/00; G02B 21/00
(52) U.S. Cl. ...................................... 315/307; 359/368
(58) Field of Search .................................. 315/125, 126, 315/291, 307; 359/368, 371, 379, 382, 385

(56) References Cited

U.S. PATENT DOCUMENTS

| | | | |
|---|---|---|---|
| 5,517,353 A | * 5/1996 | Ikoh et al. ................... 292/101 |
| 5,595,672 A | 1/1997 | Sham et al. ................. 219/257 |
| 5,666,541 A | 9/1997 | Sellers ................... 395/758.06 |
| 5,861,985 A | * 1/1999 | Ikoh ........................... 359/388 |
| 5,889,883 A | * 3/1999 | Simpkins ..................... 382/135 |
| 6,091,911 A | * 7/2000 | Sakano et al. .............. 396/432 |
| 6,133,561 A | * 10/2000 | Toshimitsu et al. ...... 250/201.3 |
| 6,384,967 B1 | * 5/2002 | Watanabe et al. ........... 359/385 |
| 6,583,928 B2 | * 6/2003 | Ooki et al. .................. 359/385 |

FOREIGN PATENT DOCUMENTS

| | | |
|---|---|---|
| EP | 0 043 133 | 1/1982 |
| WO | WO 98/18036 | 4/1998 |
| WO | WO01/97379 A2 | 12/2001 |

* cited by examiner

*Primary Examiner*—Hoanganh Le
*Assistant Examiner*—Minh Dieu A
(74) *Attorney, Agent, or Firm*—Simpson & Simpson, PLLC

(57) ABSTRACT

An apparatus for automatically turning off a source of illumination in a microscope, comprising a switch operatively arranged to control the illumination source, and means for sensing inactivity of the switch and for turning off the illumination source after a predetermined time period of inactivity. The invention also includes a method for automatically turning off a source of illumination in a microscope, comprising the steps of monitoring activity of a switch operatively arranged to control the illumination source, and, turning off the illumination source after a predetermined time period of inactivity.

11 Claims, 4 Drawing Sheets

METHOD AND APPARATUS FOR AUTOMATICALLY SHUTTING OFF A MICROSCOPE

REFERENCE TO COMPUTER PROGRAM LISTING APPENDIX

The present application includes a computer program listing appendix on compact disc. Two duplicate compact discs are provided herewith. Each compact disc contains an ASCII text file of the computer program listing as follows:
Filename: 2-step.txt
Size: 22,817 bytes
Date Created: Jul. 31, 2001
The computer program listing appendix is hereby expressly incorporated by reference in the present application.

FIELD OF THE INVENTION

The present invention relates to a method and apparatus for controlling a microscope and, more particularly, to a method and apparatus for automatically shutting off a microscope. Even more particularly, the present invention provides a method and apparatus for digitally tracking elapsed-time within a microscope for the purpose of monitoring inactivity of a momentary SPST-switch after a period of time and turning off all sources of illumination within the microscope.

BACKGROUND OF THE INVENTION

Microscopes use various types of illumination sources to provide the necessary light to illuminate the specimen being examined. Conventionally, these sources consume electrical energy, and the life of the sources is related to the amount of time the sources are active. Leaving a source on too long can also damage the specimen under study. It is desirable then, to conserve operating expense, extend illumination source life, and prevent damage to specimens, to activate the light sources only when the microscope is in use, and de-activate the source when not in use. In normal operation, a microscope user manually activates the illumination source to commence use of the microscope, and may even alter illumination source modes (reflected light, transmitted light or a combination of both modes) during use. Unfortunately, a user may forget to deactivate the light source after use of the microscope, which causes increased operating expense and shortened source life. The problem to be solved, then, is not that of turning on a source of illumination, for this must necessarily be done prior to use, but that of turning off the source after use, for this is not necessary and may be neglected.

Unlike many household and other appliances and electronic equipment that feature "power-down" capability, it is typically desired with microscopes that the "power-down" feature be activated a relatively long time (i.e., as much as an hour or two) after some triggering event. Thus, while it might be desirable to de-energize a household iron a few minutes after non-use, such is not typically the case with a microscope. This is important to note since analog shut-down devices that are sometimes used in such appliances are not suitable or capable of powering down devices after long periods of time from a triggering event.

Power-down circuits are well known in devices other than optical devices such as microscopes. For example, U.S. Pat. No. 5,595,672 (Sham et al.) discloses an automatic power interrupting apparatus for an electric appliance, such as a pressing iron. The apparatus of Sham et al. uses a touch sensitive switch (a capacitive device) to sense use of the device. When the human hand ceases contact with the switch, the apparatus activates an analog timing circuit (which uses capacitors as timing devices) to shut off power to the iron. The invention includes a second temperature sensitive shut-off circuit which powers down the device should the heating element in the iron reach a predetermined level. Although this patented device is arguably an improvement over earlier mercury switch shut-off devices for irons, the circuit in this invention uses a relatively expensive touch sensitive switch, and the analog timing circuit is incapable of timing long periods of time (e.g., anything longer than a minute or so).

Automatic control circuits for optical devices are also known in the art. U.S. Pat. No. 5,861,985 (Ikoh) discloses an automatic microscope including a detector for detecting the presence of an observer of the microscope within a predetermined range around the microscope. The detector of the patented invention also functions to power down the microscope when the observer leaves the predetermined range around the microscope. Although not described in detail in the patent, the detector in this invention appears to be a phototransistor. When ambient light incident on the transistor is blocked by a user, the phototransistor triggers appropriate circuitry to power up the illumination source. Similarly, when the observer leaves the predetermined range, the ambient light returns and the transistor switch sends an appropriate signal to power down the illumination source. The invention actually discloses three such phototransistor detectors. There are several disadvantages of this type of this circuit. First, the detectors are dependent on ambient light levels and the designers of this circuit presumably assume that the microscope will always be used in certain ambient light conditions, which may not always be the case. (For example, the circuit may not function properly in a low-ambient light environment.) Secondly, phototransistors are relatively expensive as compared to simple mechanical switches, and the patented invention uses three of them. Finally, and most importantly, the patent includes no teaching of a timing mechanism to control illumination. On the contrary, the illumination power source is tied directly to the detection of an observer. The sources turn on and off almost immediately upon detection of a person within range, or leaving range, respectively. The disadvantage of this control scheme is that it causes a cycling of the electronic drive circuitry and associated power sources, and it is well known in the art that repetitive cycling degradates life of certain light sources, such as incandescent light bulbs.

A similar control device for a microscope is disclosed in PCT International Application No. WO 98/18036 (Rühl et al.). The invention disclosed in this application includes a proximity sensor which senses the approach of an observer and controls illumination and motor function in the microscope in response thereto. This invention suffers from some of the same disadvantages described earlier.

Finally, a light source unit for an optical apparatus, namely an endoscope, is disclosed in European Patent Application No. 81105036.8 (Hattori). The apparatus of this invention includes a light emitting device and a light receiving device, both preferably arranged in the eyepiece of the endoscope. The light emitting device emits light-intensity modulated light. The received light is demodulated and filtered and a frequency component of the received signal is then compared to a Schmitt trigger reference voltage. When an observer places her eye proximate the eyepiece, more light from the emitter reaches the receiver. The signal level supplied to the Schmitt trigger then exceeds a predetermined value and associated electronics turns on a light source within the endoscope (or controls a shutter). Again, this invention teaches an "on-off" approach to controlling the light source. The source is either on or off; there is no teaching of a time delay in turning the source off.

Thus, it is seen that there is a longfelt need for a method and apparatus for automatically shutting off a microscope, and especially for a method and apparatus for digitally tracking elapsed-time within the microscope for the purpose of monitoring inactivity of a momentary SPST-switch after a period of time and turning off all sources of illumination within the microscope.

SUMMARY OF THE INVENTION

The invention broadly comprises a method and apparatus for controlling a microscope and, more particularly, for automatically turning off a source of illumination in a microscope. The apparatus of the invention comprises a switch operatively arranged to control the illumination source, and means for sensing inactivity of the switch and for turning off the illumination source after a predetermined time period of inactivity. The method includes the steps of monitoring activity of a switch operatively arranged to control the illumination source, and, turning off the illumination source after a predetermined time period of inactivity.

A general object of the invention is to provide a method and apparatus for controlling an illumination source in a microscope.

Another object of the invention is to provide a method and apparatus for automatically turning off an illumination source in a microscope after a predetermined period of inactivity of a switch which controls the illumination source.

Still another object of the invention is to provide a method and apparatus for digitally monitoring activity of a switch in a microscope to enable shutdown of the microscope's illumination source after relatively long periods of inactivity of the switch, which control is not possible with conventional analog timing and control devices and circuits.

A further object of the invention is to provide a method and apparatus for operating a microscope more efficiently, for preserving illumination source life, and for preventing damage to specimens under study due to excessive illumination.

These and other objects, features and advantages of the present invention will become readily apparent to those having ordinary skill in the art from a reading and study of the following detailed description of the invention, in view of the drawing and appended claims.

BRIEF DESCRIPTION OF THE DRAWING

The nature and mode of operation of the present invention will now be more fully described in the following detailed description of the invention taken with the accompanying drawing figures, in which.

DETAILED DESCRIPTION OF THE INVENTION

At the outset, it should be appreciated that like reference numbers on different drawing views represent identical circuit/structural elements of the invention. It should also be appreciated that the following definitions are intended as an aid in understanding the invention and interpreting the claims:

Switch: as used in the description of the invention which follows, the term "switch" is intended to mean any electrical switch, both mechanical and electrical. The switch may take many different forms. It may be a pushbutton switch, a toggle switch, a rotary switch, a slide switch, a mercury switch, or the like. The term switch is not intended to be limited to mechanical switches, although a mechanical switch is described and disclosed in a preferred embodiment. The "switch" may also include electronic switches, such as capacitive sensors, phototransistors, infrared detectors, piezoelectric switches, and the like. The term "switch" is intended to mean both "normally open" and "normally closed" switches.

Illumination Source: includes any source of illumination used in a microscope, including but not limited to incandescent light bulbs (Halogen, Tungsten, etc.). Inactivity: The term "inactivity" is used herein to describe the state of a switch in-between switching operations. It is that period of time during which the switch is not being operated. For example, if a switch is "turned on" at 12:00 p.m. and "turned off" at 2:00 p.m., the switch would be "inactive" for a period of two hours. Similarly, if a switch is "turned off" at 12:00 p.m. and "turned on" at 2:00 p.m., the switch would be "inactive" for a period of two hours. The period of inactivity is measured from the instant in time when the switch was last actuated (i.e., turned on or off). For a momentary contact SPST switch, for example, inactivity would be measured or sensed from the last time the pushbutton was pushed.

Figure 1:
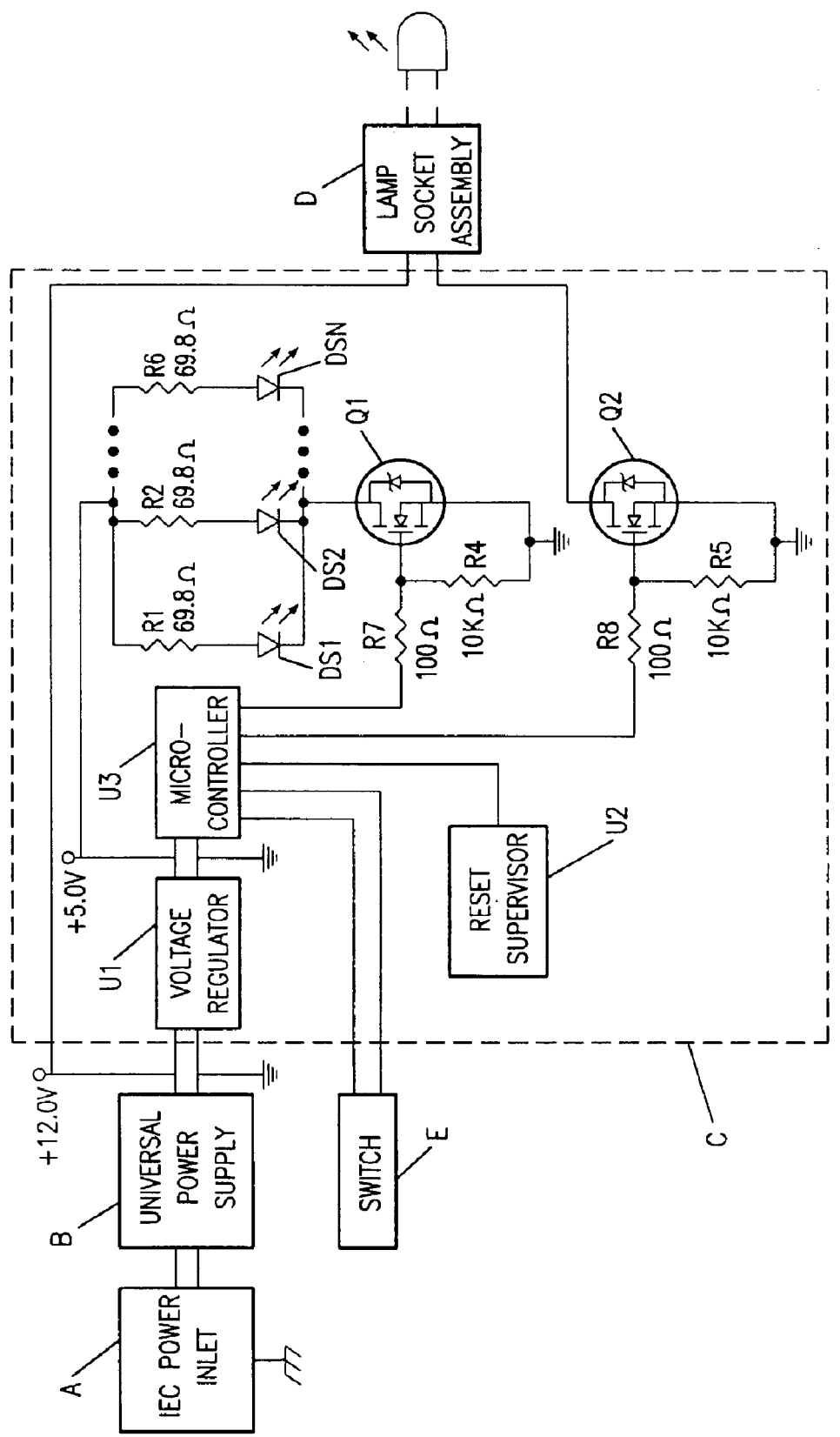
FIG. 1 is a block diagram of the electrical circuit of the present invention.

Referring now to the drawings, FIG. 1 is a schematic block diagram of a preferred embodiment of the electronic system of the invention for controlling a microscope. Component A is an International Electrotechnical Commission (IEC) style appliance coupler with dual-pole fuse holders used to accept any IEC-60320-1 style power cord. Component B is a universal power supply. Component C is the main controller printed circuit board which includes a voltage regulator U1 (LM340T-5.0 or equivalent), microcontroller U3 (PIC16C54C-04P(18) or equivalent), reset supervisor U2 (MCP100-460DI/TO or equivalent), multiple light emitting diodes (DS1–DSN), two MOSFETs (Q1 & Q2) (IRLZ44N or equivalent), and various resistors and capacitors as shown in the detailed electronic schematic diagram of FIGS. 2A, 2B and 2C.

An input power signal in the range from 100–240 VAC+/−10%, 50/60 Hz is applied to the universal power supply via the appliance coupler, an output voltage of 12.0 VDC is transferred from the output of the universal power supply to the input of U1 and the connector for lamp socket assembly D on the main controller printed circuit board. U1 steps down the 12.0 VDC signal to a 5.0 VDC signal that powers all the integrated circuits within main board C.

Upon powering the main board, U2 holds U3 in a reset state for a preconditioning period of time to allow U3's crystal to stabilize. After the preconditioning period of time, U3 begins operation. The first routine executed by U3 is an initialization routine that configures the internal registers for U3 and causes U3 to set external devices in a predefined state. Subsequently, the system is designed to place Q1 and Q2 in an off-state by sending a logic-low (0.0 VBC) signal to each gate. Therefore, after initialization, all the sources of illumination are in the off-state or powered down.

After the initialization routine, the main routine is executed. During the main routine two major events are monitored. First, switch E is polled for activity and time is monitored from the last activation of switch E. If no activity on switch E is detected after a predetermined period of time, all the sources of illumination are turned off. Any activity on switch E will reset the registers tracking time within U3 to zero.

Each time the switch is pressed U3 cycles through the following four events. First, the source of illumination in the lamp socket assembly is turned on. Second, the LEDs are turned on while the source of illumination in the lamp socket assembly is turned off. Third, while the LEDs are left in the on-state, the source of illumination in the lamp socket assembly is turned on. Fourth, all the sources of illumination are turned off.

The process of tracking time from the last activity on the momentary SPST-switch is part of the auto-off feature incorporated into the main body of the software program, included herein on compact disc.

Within the microcontroller and depending on the crystal oscillator's value, each instruction that is executed takes a fixed period of time. With a 20 MHz crystal oscillator driving U3 each instruction is executed in 200 nS.

During the process of monitoring activity on switch E (polling the switch), the main routine executes a series of instructions at three constant rates because of the branching structure established for tracking time: 25.000 mS, 25.0012 mS, and 25.0024 mS. At the end of the main routine, the software loops back to the beginning of the main routine. The standard time to go from the beginning to the end of the main routine is 25.000 mS. After 40 executions of the main routine to produce 1 second of instructions the main routine branches off to increment a "seconds" tracking register/counter. Similarly, after 60 seconds, the main routine branches off to increment a "minutes" tracking register/counter. When the main routine has to increment the seconds counter or minutes counter an error of 1.2 $\mu$S is added to the actual time. Therefore, over a period of an hour, the actual time will be off 4.392 mS, which error may be corrected.

If no activity is detected on switch E after a preprogrammed period of time within the software, all the sources of illumination within the microscope will be turned off by sending a logic-low (0.0 VDC) signal to Q1 and Q2. Any activity on switch E will reset the milliseconds, seconds and minutes counters to zero and begin tracking elapsed-time again.

Figure 2A:
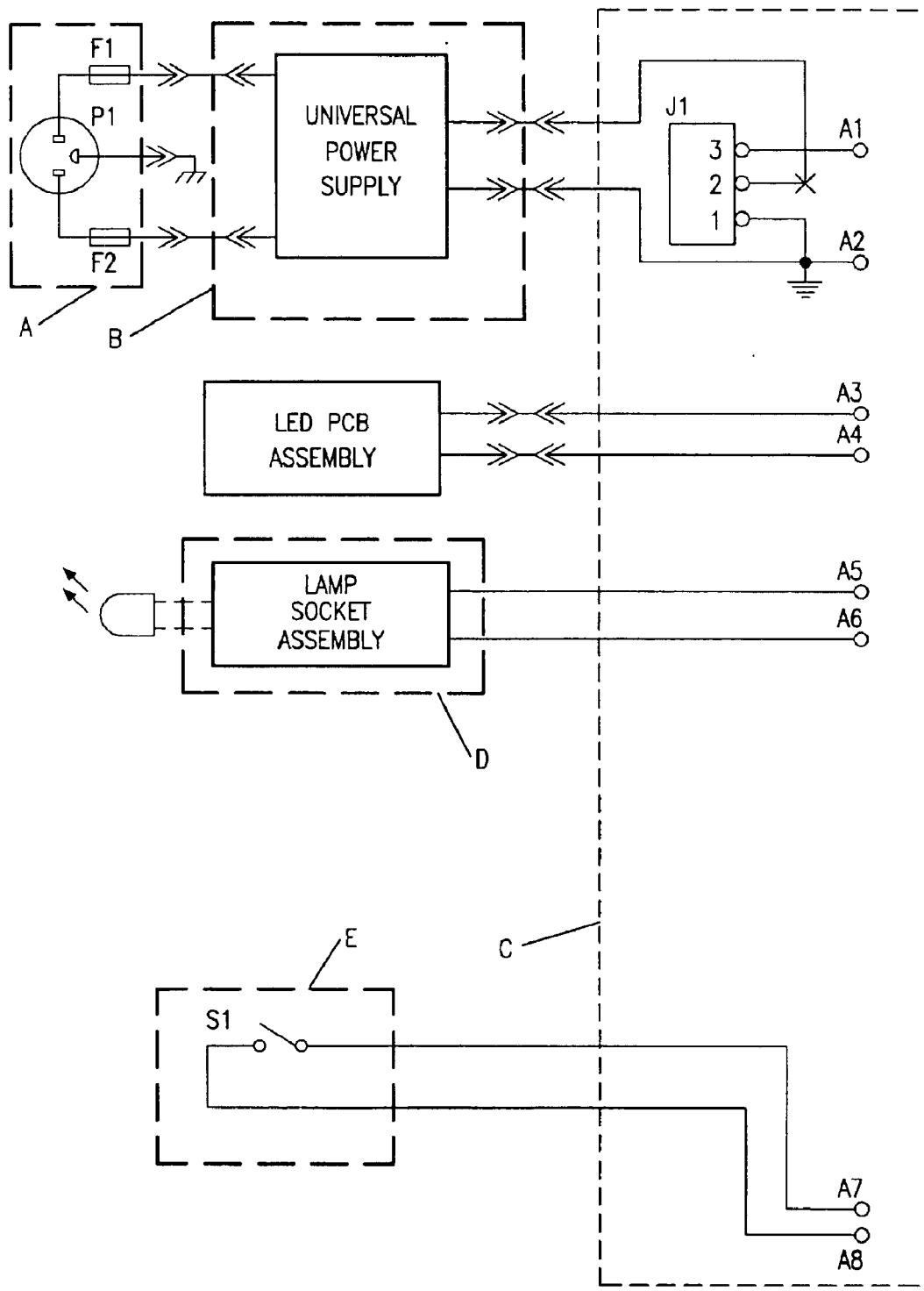
FIGS. 2A, 2B and 2C comprise a detailed electronic schematic diagram of the circuit of the present invention.
Figure 2B:
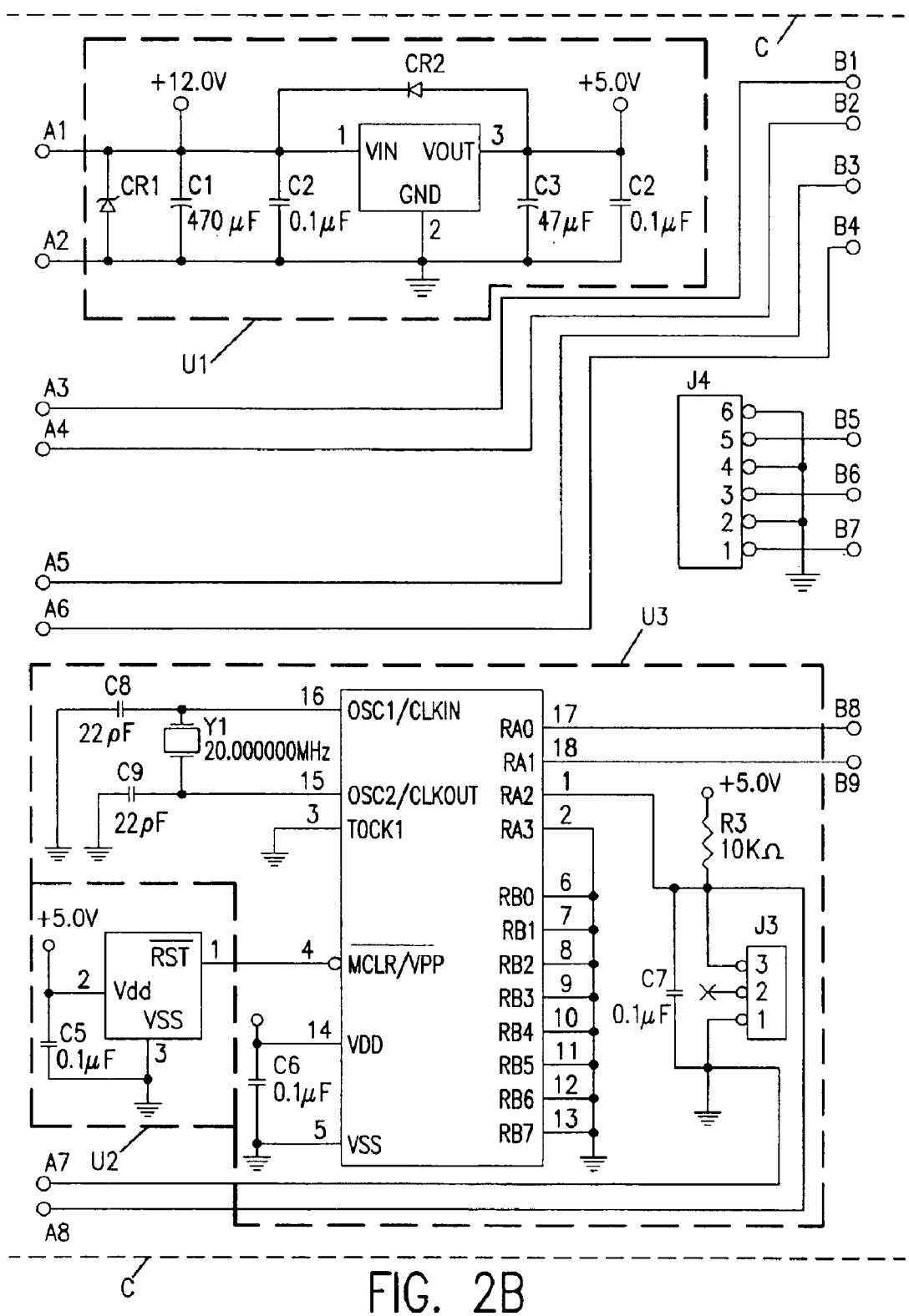
Figure 2C:
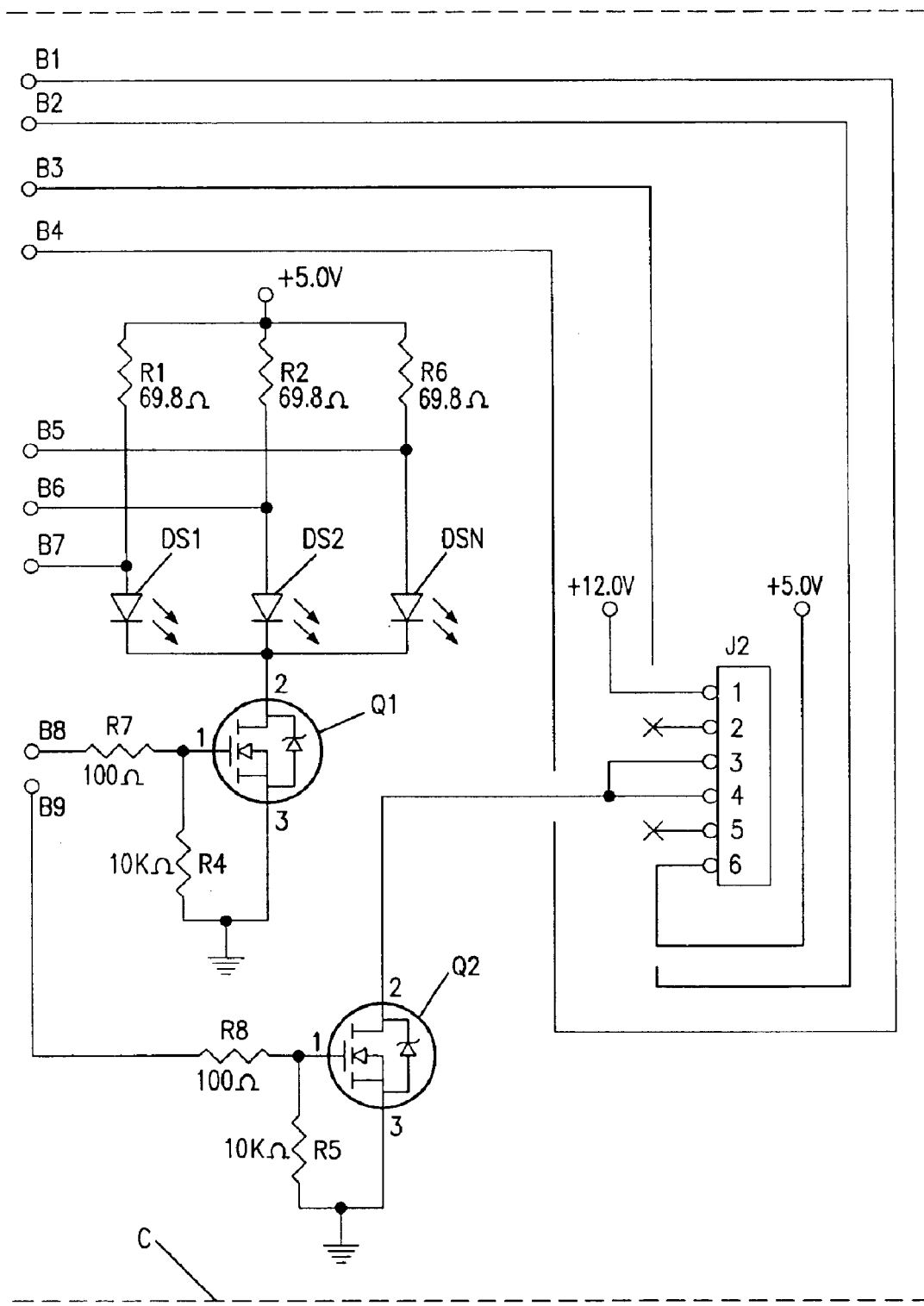

To enable one having ordinary skill in the art to make the invention, a detailed electronic schematic diagram is provided in FIGS. 2A, 2B and 2C, showing all circuit elements, their values, and interconnections. Interconnections are shown in the various drawing views by jumpers labeled A1, A2, A3 . . . B1, B2, B3 . . . For example, a lead labeled A3 on FIG. 2A is connected to a lead labeled A3 on FIG. 2B, etc.

Thus, it is seen that the objects of the invention are efficiently obtained, although changes and modifications to the invention can be readily appreciated by those having ordinary skill in the art, and these changes and modifications are intended to be within the spirit and scope of the invention as claimed.

What is claimed is:

1. An apparatus for automatically turning off a source of illumination in a microscope, comprising:
   a switch operatively arranged to control said illumination source;
   means for sensing inactivity of said switch and for turning off said illumination source after a predetermined time period of inactivity.

2. The apparatus recited in claim 1, wherein said switch is a mechanical switch.

3. The apparatus recited in claim 2, wherein said switch is a single pole, single throw switch.

4. The apparatus recited in claim 1, wherein said means for sensing inactivity of said switch and for turning off said illumination source after a predetermined time period of inactivity comprises a microprocessor.

5. The apparatus recited in claim 1, wherein said means for sensing inactivity of said switch comprises a digital semiconductor device operatively arranged to sense a logic level at one terminal of said switch.

6. The apparatus recited in claim 1, wherein said illumination source is an incandescent light bulb.

7. An apparatus for automatically turning off a power supply in a microscope, comprising:
   at least one switch element operatively arranged to control said power supply; and,
   means for sensing inactivity of said at least one switch element and for turning off said power supply after a predetermined time period of inactivity.

8. The apparatus recited in claim 7 further comprising an illumination source controlled by said means for sensing inactivity of said at least one switch element.

9. A method for automatically turning off a source of illumination in a microscope, comprising the steps of:
   monitoring activity of a switch operatively arranged to control said illumination source; and,
   turning off said illumination source after a predetermined time period of inactivity.

10. The method recited in claim 9 wherein said step of monitoring activity of a switch comprises monitoring a logic level at one terminal of said switch, and triggering a shutdown of said illumination source when a transition in said logic level occurs.

11. The method recited in claim 9 wherein said step of monitoring is done digitally.

* * * * *